United States Patent
Han (10) Patent No.: US 10,572,082 B2
(45) Date of Patent: Feb. 25, 2020

(54) FORCE-TOUCH PANEL, FORCE-TOUCH SENSING DEVICE AND DISPLAY SYSTEM HAVING THE SAME

(71) Applicant: LEADING UI CO., LTD., Anyang-si (KR)

(72) Inventor: Sang-Hyun Han, Anyang-si (KR)

(73) Assignee: LEADING UI CO., LTD. (KR)

( * ) Notice: Subject to any disclaimer, the term of this patent is extended or adjusted under 35 U.S.C. 154(b) by 0 days.

(21) Appl. No.: 15/679,374

(22) Filed: Aug. 17, 2017

(65) Prior Publication Data
US 2018/0052544 A1  Feb. 22, 2018

(30) Foreign Application Priority Data

Aug. 17, 2016  (KR) .................. 10-2016-0104054

(51) Int. Cl.
*G06F 3/044* (2006.01)
*G01L 1/14* (2006.01)
*G06F 3/041* (2006.01)

(52) U.S. Cl.
CPC .............. *G06F 3/044* (2013.01); *G01L 1/14* (2013.01); *G01L 1/146* (2013.01); *G06F 3/0416* (2013.01); *G06F 2203/04105* (2013.01); *G06F 2203/04106* (2013.01)

(58) Field of Classification Search
CPC ...... G06F 3/0414; G06F 3/016; G06F 3/0487; G06F 2203/04105
See application file for complete search history.

(56) References Cited

U.S. PATENT DOCUMENTS

| | | | |
|---|---|---|---|
| 2015/0116242 A1* | 4/2015 | Oh | ............... G06F 3/044 345/173 |
| 2016/0364071 A1* | 12/2016 | Chiang | ............. G06F 3/0416 |
| 2017/0045992 A1* | 2/2017 | Lee | ............ G06F 3/0416 |
| 2017/0220175 A1 | 8/2017 | Kim et al. | |
| 2017/0220244 A1 | 8/2017 | Kim et al. | |
| 2017/0371470 A1* | 12/2017 | Nathan | ........... G06F 3/0414 |

FOREIGN PATENT DOCUMENTS

| JP | WO2014/045847 A1 | 3/2014 |
|---|---|---|
| KR | 10-2016-0012690 A | 2/2016 |
| KR | 10-2016-0042236 | 4/2016 |
| KR | 10-1634315 | 6/2016 |

* cited by examiner

*Primary Examiner* — Sanghyuk Park
(74) *Attorney, Agent, or Firm* — Leepi (57) ABSTRACT

A force-touch panel having a touch-sensing function and a force-sensing function, a force-touch detection device and a display system having the force-touch panel are disclosed. The force-touch panel includes a plurality of driving lines, a plurality of touch-sensing lines and a plurality of force-sensing lines. The driving lines have a plurality of driving electrodes connected in series. The touch-sensing lines in which a plurality of touch-sensing electrodes is connected in series are disposed so as to be covered by each of the driving electrodes. The force-sensing lines in which a plurality of force-sensing electrodes is connected in series, disposed on the same plane as the touch-sensing lines.

13 Claims, 10 Drawing Sheets

CAPACITANCE VALUE OF TRX

FIG. 8B

CAPACITANCE VALUE OF FRX

CAPACITANCE VALUE OF TRX

FIG. 10B

CAPACITANCE VALUE OF FRX

FORCE-TOUCH PANEL, FORCE-TOUCH SENSING DEVICE AND DISPLAY SYSTEM HAVING THE SAME

CROSS-REFERENCE TO RELATED APPLICATIONS

This application claims priority under 35 U.S.C. § 119 to Korean Patent Application No. 10-2016-0104054, filed on Aug. 17, 2016 in the Korean Intellectual Property Office (KIPO), the contents of which are herein incorporated by reference in their entirety.

BACKGROUND OF THE INVENTION

Technical Field

Exemplary embodiments of the present invention relate to a force-touch panel, a force-touch detection device and a display system having the force-touch panel. More particularly, exemplary embodiments of the present invention relate to a force-touch panel having a touch-sensing function and a force-sensing function, a force-touch detection device having the force-touch panel and a display system having the force-touch panel.

Discussion of the Related Art

Generally, a touch screen may constitute a touch surface of a touch input device including a touch panel, which may be a transparent panel having a touch-sensitive surface. The touch panel is attached to the front of the display screen such that the touch-sensitive surface can cover a visible surface of the display screen.

The touch screen by the user simply contacts the screen with a finger or the like so that the user can operate the computing system. In general, the touch screen recognizes the touch and the touch position on the panel, and the computing system can perform accordingly operation by interpreting this contact. Here, there is a need for a touch input device capable of detecting a pressure (or force) amount of a touch as well as a touch position corresponding to a touch on the touch screen without deteriorating the performance of the display module.

In consideration of the above, a touch input device has been proposed which includes a display module capable of detecting not only the position of a touch on a touch screen but also the size of the touch force.

Further, a touch input device has been proposed which includes a display module configured to detect a touch position and a force size of a touch without decreasing the visibility and light transmittance of the display module.

SUMMARY

Exemplary embodiments of the present invention provide a force-touch panel provided with a touch-sensing function and a force-sensing function so as to detect a touch force as well as a touch position on a touch screen.

Exemplary embodiments of the present invention also provide a force-touch detection device having the above-mentioned force-touch panel.

Exemplary embodiments of the present invention further also provide a display system having the above-mentioned force-touch panel.

According to one aspect of the present invention, a force-touch panel includes a plurality of driving lines, a plurality of touch-sensing lines and a plurality of force-sensing lines. The driving lines have a plurality of driving electrodes connected in series. The touch-sensing lines in which a plurality of touch-sensing electrodes is connected in series are disposed so as to be covered by each of the driving electrodes. The force-sensing lines in which a plurality of force-sensing electrodes is connected in series, disposed on the same plane as the touch-sensing lines.

In an exemplary embodiment of the present invention, each of the driving electrodes may have a diamond shape, and each of the driving lines may have a band shape in which diamond shapes are connected in series.

In an exemplary embodiment of the present invention, each of the touch-sensing electrodes may have a diamond shape, and each of the touch-sensing lines may have a band shape in which diamond shapes are connected in series.

In an exemplary embodiment of the present invention, each of the force-sensing electrodes may have a diamond shape, and each of the force-sensing lines may have a band shape in which diamond shapes are connected in series.

In an exemplary embodiment of the present invention, the driving line may extend along a first axis, and each of the touch-sensing line and the force-sensing line may extend along a second axis.

In an exemplary embodiment of the present invention, a size of each of the force-sensing electrodes may be substantially smaller than a size of each of the driving electrodes.

In an exemplary embodiment of the present invention, when viewed in a plane, each of the driving electrodes may completely cover each of the force-sensing electrodes.

In an exemplary embodiment of the present invention, when viewed in a plane, each of the touch-sensing electrodes may be formed to cover an area where the driving electrodes are not formed.

In an exemplary embodiment of the present invention, when viewed in a plane, each of the force-sensing electrodes may be formed in an area where the driving electrodes are formed.

According to another aspect of the present invention, a force-touch sensing device includes a force-touch panel, a driving unit, a touch sensing unit, a force-sensing unit and a control unit. The force-touch panel includes a plurality of driving lines, a plurality of touch-sensing lines and a plurality of force-sensing lines. The driving lines have a plurality of driving electrodes connected in series. The touch-sensing lines in which a plurality of touch-sensing electrodes is connected in series are disposed so as to be covered by each of the driving electrodes. The force-sensing lines in which a plurality of force-sensing electrodes is connected in series, disposed on the same plane as the touch-sensing lines. The driving unit supplies a driving signal to each of the driving lines. The touch sensing unit receives a touch-sensing signal from each of the touch-sensing lines. The force-sensing unit receives a force-sensing signal from each of the force-sensing lines. The control unit controls the operation of the touch sensing unit and the force-sensing unit, calculates whether a touch is generated or not and a touch position based on the touch-sensing signals, and calculates whether a force is generated or not and a force position based on the force-sensing signals.

In an exemplary embodiment of the present invention, the touch-sensing signal may be a signal coupled by a capacitance formed between the driving electrode and the touch. The force-sensing signal may be a signal coupled by a capacitance formed between the driving electrode and the force-sensing electrode.

In an exemplary embodiment of the present invention, the driving unit, the touch sensing unit, the force-sensing unit and the control unit may be implemented in a single chip.

According to another aspect of the present invention, a display system includes a display panel and a force-touch panel. The force-touch panel is disposed on the display panel. The force-touch panel includes a plurality of driving lines, a plurality of touch-sensing lines and a plurality of force-sensing lines. The driving lines have a plurality of driving electrodes connected in series. The touch-sensing lines in which a plurality of touch-sensing electrodes is connected in series are disposed so as to be covered by each of the driving electrodes. The force-sensing lines in which a plurality of force-sensing electrodes is connected in series, disposed on the same plane as the touch-sensing lines.

In an exemplary embodiment of the present invention, the force-touch panel may further include a first insulation layer formed below the driving lines. Here, the touch-sensing lines are below the first insulation layer.

In an exemplary embodiment of the present invention, the force-touch panel may further include a first insulation layer formed below the driving lines. Here, the touch-sensing lines and the touch-sensing lines are formed on the same surface of the first insulation layer.

In an exemplary embodiment of the present invention, the force-touch panel may further include a first insulation layer formed below the driving lines. Here, the force-sensing lines are formed on a first surface of the first insulation layer, and the touch-sensing lines are formed on a second surface of the first insulation layer.

In an exemplary embodiment of the present invention, the force-touch panel may further include a first insulation layer formed below the driving lines and a second insulation layer formed below the first insulation layer. Here, the force-sensing lines are formed on a first surface of the first insulation layer, and the touch-sensing lines are formed on a first surface of the second insulation layer.

According to a force-touch panel, a force-touch detection device and a display system having the force-touch panel, driving lines are disposed close to a surface to be touched by a finger of a user, touch-sensing lines and force-sensing lines are disposed far from the surface to form a force-touch panel, so that a touch-sensing function and a force-sensing function may be provided to a force-touch panel. Accordingly, not only a touch position on a touch screen, but also a touch force may be detected.

BRIEF DESCRIPTION OF THE DRAWINGS

The above and other features and aspects of the present invention will become more apparent by describing in detailed exemplary embodiments thereof with reference to the accompanying drawings, in which.

DETAILED DESCRIPTION OF THE INVENTION

The present invention is described more fully hereinafter with reference to the accompanying drawings, in which exemplary embodiments of the present invention are shown. The present invention may, however, be embodied in many different forms and should not be construed as limited to the exemplary embodiments set forth herein. Rather, these exemplary embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of an area of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 1:
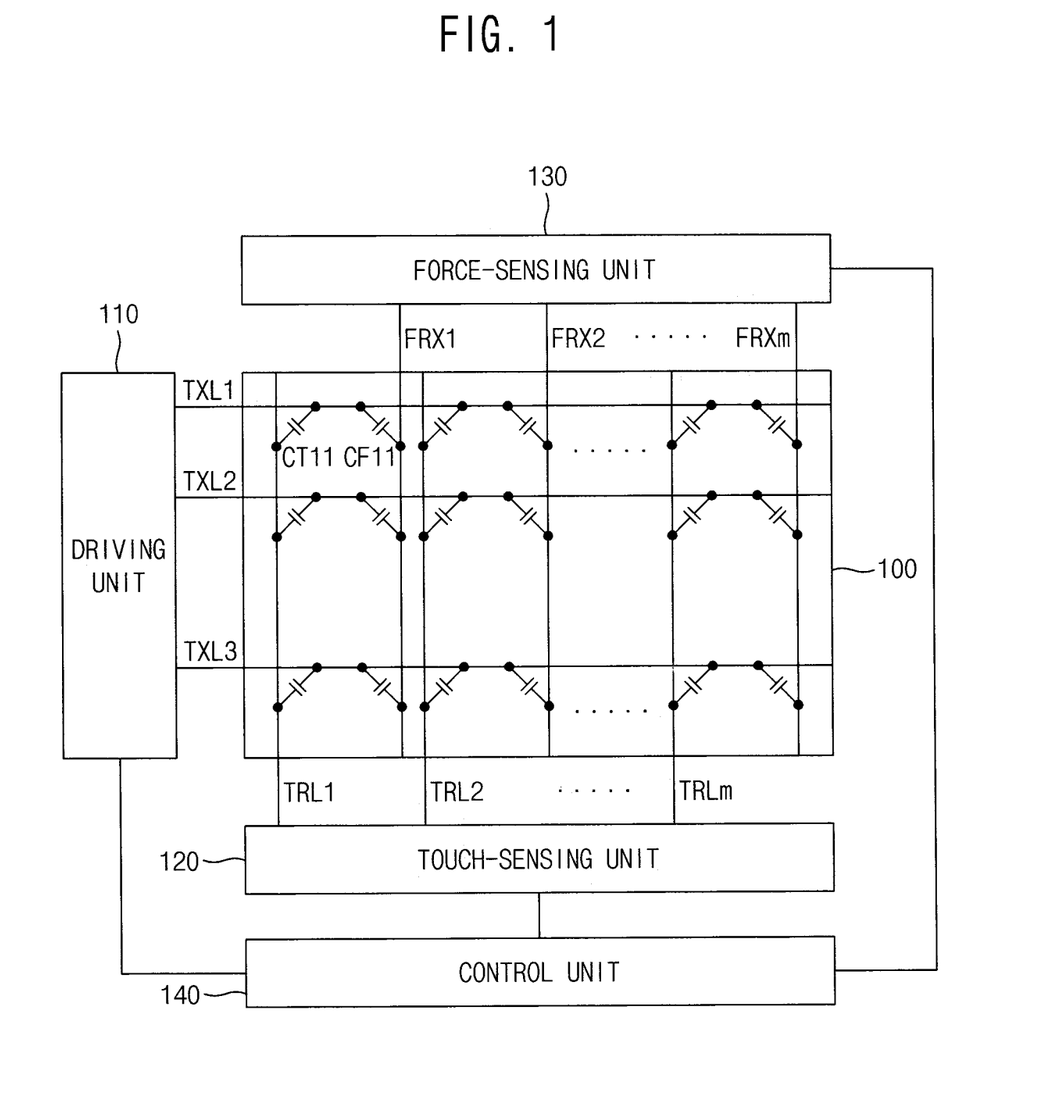
FIG. 1 is a block diagram schematically illustrating a force-touch detection device according to an exemplary embodiment of the present invention.

FIG. 1 is a block diagram schematically illustrating a force-touch detection device according to an exemplary embodiment of the present invention.

Referring to FIG. 1, a force-touch detection device includes a force-touch panel 100, a driving unit 110, a touch sensing unit 120, a force-sensing unit 130 and a control unit 140.

The force-touch panel 100 includes a plurality of driving lines TXL1 to TXLn, a plurality of touch-sensing lines TRL1 to TRLm, and a plurality of force-sensing lines FRL1 to FRLm.

In FIG. 1, although the driving lines TXL1 to TXLn and the touch-sensing lines TRL1 to TRLm are shown as constituting an orthogonal array (i.e., a matrix shape) with respect to each other, the present invention is not limited thereto and the driving lines TXL1 to TXLn and the touch-sensing lines TRL1 to TRLm may have any number of dimensions including its diagonal, concentric and three-dimensional random arrangement and its application arrangement. Here, 'n' and 'm' are positive integers and may have the same value or different values. Depending on an exemplary embodiment, 'n' and 'm' may vary in size.

Further, in FIG. 1, it is shown that the driving lines TXL1 to TXLn and the force-sensing lines FRL1 to FRLm are disposed in an orthogonal array. However, the present invention is not limited to that, and the driving lines TXL1 to TXLn and the force-sensing lines FRL1 to FRLm may have various numbers of dimensions such as diagonal lines, concentric circles and three-dimensional random arrangements, and their application arrangements. Here, 'n' and 'm' are positive integers and may have the same value or different values. Depending on an exemplary embodiment, 'n' and 'm' may vary in size.

As shown in FIG. 1, the driving lines TXL1 to TXLn and the touch-sensing lines TRL1 to TRLm may be arranged to cross each other. Each of the driving lines TXL1 to TXLn may include a plurality of driving electrodes extending in a first axis direction, and each of the touch-sensing lines TRL1 to TRLm may include a plurality of touch-sensing electrodes extending in a second axis direction crossing the first axis direction.

Further, as shown in FIG. 1, the driving lines TXL1 to TXLn and the force-sensing lines FRL1 to FRLm may be arranged to cross each other. Each of the force-sensing lines FRL1 to FRLm may include a plurality of force-sensing electrodes extending in a second axial direction crossing a first axial direction.

In the force-touch panel 100 according to the present exemplary embodiment of the present invention, the force-sensing lines FRL1 to FRLm and the touch-sensing lines TRL1 to TRLm may be formed on the same layer. For example, the force-sensing lines FRL1 to FRLm and the touch-sensing lines TRL1 to TRLm may be formed on the same surface of an insulation layer (not shown). Alternatively, the force-sensing lines FRL1 to FRLm and the touch-sensing lines TRL1 to TRLm may be formed on different layers. For one example, the force-sensing lines FRL1 to FRLm and the touch-sensing lines TRL1 to TRLm may be formed on both surfaces of an insulation layer (not shown). For another example, the force-sensing lines FRL1 to FRLm may be formed on a surface of a first insulation layer (not shown) and the touch-sensing lines TRL1 to TRLm may be formed on a surface of a second insulation layer (not shown) different from the first insulation layer. The second insulation layer may be formed below the first insulation layer.

The driving lines TXL1 to TXLn, the touch-sensing lines TRL1 to TRLm and the force-sensing lines FRL1 to FRLm are formed of a transparent conductive material (for example, Indium Tin Oxide (ITO) or Antimony Tin Oxide (ATO) made of tin oxide ($SnO_2$) and indium oxide ($In_2O_3$) or the like). However, this is merely an example, and the driving line TXL, the touch-sensing line TRL, and the force-sensing lines FRL1 to FRLm may be formed of other transparent conductive materials or opaque conductive materials. For example, the driving line TXL, the touch-sensing line TRL and the force-sensing lines FRL1 to FRLm may include at least one of silver ink, copper or carbon nanotubes (CNTs). Moreover, the driving line TXL, the touch-sensing line TRL and the force-sensing lines FRL1 to FRLm may be formed of a metal mesh or may be formed of a nano silver material.

The driving unit 110 applies a driving signal to the driving lines TXL1 to TXLn for an operation of the force-touch panel 100. In the present exemplary embodiment, the driving signal may be sequentially applied to one driving line at a time from a first driving line TX1 to an (n)-th driving line TXn. The applying of the driving signal may be repeated again. This is merely an example, and driving signals may be simultaneously applied to plural driving lines in accordance with an exemplary embodiment.

The touch sensing unit 120 receives a touch-sensing signal including information on a capacitance change amount that changes according to a touch with respect to a touch surface of the force-touch panel 100, and detects whether or not the force-touch panel 100 is touched and a touch position. The touch sensing unit 120 may detect whether or not it is touched and a touch position by receiving a touch-sensing signal including information on a capacitance CT generated between the driving lines TXL1 to TXLn to which the driving signal is applied through the touch-sensing lines TRL1 to TRLm and the touch-sensing lines TRL1 to TRLm. For example, the touch-sensing signal may be a signal in which the driving signal applied to the driving line TXL is coupled by the capacitance CF generated between the driving line TXL and the touch-sensing line TRL. The process of sensing the drive signal applied from the first driving line TXL1 to the n-th driving line TXLn through the touch-sensing lines TRL1 to TRLm may be referred to as "scanning the force-touch panel 100".

The touch sensing unit 120 may include a receiver (not shown) connected to each of the touch-sensing lines TRL1 to TRLm through a switch. The switch is turned on during a period of sensing a signal of the touch-sensing line TRL so that a touch-sensing signal may be sensed at the receiver from the touch-sensing line TRL.

The receiver may include an amplifier (not shown) and a feedback capacitor coupled between a negative input terminal of the amplifier and an output terminal of the amplifier. In this case, a positive input terminal of the amplifier may be connected to a ground. Further, the receiver may further include a reset switch connected in parallel with the feedback capacitor.

The reset switch may reset a conversion from current to voltage performed by the receiver. The negative input terminal of the amplifier may be connected to the corresponding touch-sensing line TRL to receive a current signal including information on the capacitance CT and then integrate the current signal to convert the current signal into a voltage.

The touch sensing unit 120 may further include an analog-to-digital converter (ADC) (not shown) converting data integrated through the receiver into digital data. The digital data may then be input to a processor (not shown) and processed to obtain touch information for the force-touch panel 100. In addition, the touch sensing unit 120 may include the ADC and the processor.

The force-sensing unit 130 receives a force-sensing signal including information on a capacitance change amount that changes according to a force with respect to a touch surface of the force-touch panel 100, and detects whether or not the force-touch panel 100 is forced and a force position. The force-sensing unit 130 may detect whether or not it is forced and a force position by receiving a force-sensing signal including information on a capacitance CT generated between the driving lines TXL1 to TXLn to which the driving signal is applied through the force-sensing lines FRL1 to FRLm and the force-sensing lines FRL1 to FRLm. For example, the force-sensing signal may be a signal in which the driving signal applied to the driving line TXL is coupled by the capacitance CF generated between the driving line TXL and the force-sensing line FRL. The process of sensing the drive signal applied from the first driving line TXL1 to the n-th driving line TXLn through the force-sensing lines FRL1 to FRLm may be referred to as "scanning the force-touch panel 100".

The control unit 140 may control operation of the driving unit 110, the touch sensing unit 120 and the force-sensing unit 130. For example, the control unit 140 may generate a driving control signal and transmit the driving control signal to the driving unit 200, so that the driving signal may be applied to the driving line TXL previously set at a predetermined time. Further, the control unit 140 may generate a sensing control signal and transmit the sensing control signal to the touch sensing unit 120, so that the touch sensing unit 120 may be designed to receive a touch-sensing signal from a predetermined touch-sensing line TRL at a predetermined time to perform a predetermined function.

In FIG. 1, the driving unit 110 and the touch sensing unit 120 may configure a touch detection device (not shown) capable of detecting whether or not the force-touch panel 100 is touched and the touch position according to an exemplary embodiment of the present invention. The force-touch detection device may further include a control unit 140. The force-touch detection device may be integrated on a touch sensing IC as a touch sensing circuit in a touch input device including the force-touch panel 100. The driving line TXL, the touch-sensing line TRL and the force-sensing line FRL included in the force-touch panel 100 may be connected to the driving unit 110 and the touch sensing unit 120 included in the touch sensing IC (not shown) through, for example, a conductive trace and/or a conductive pattern printed on a circuit board. The touch sensing IC may be positioned on a circuit board on which a conductive pattern is printed. The touch sensing IC may be mounted on a main board for operating a touch input device in accordance with an exemplary embodiment.

As described above, a capacitance C having a predetermined value is generated at each intersection of the driving line TXL, the touch-sensing line TRL, and the force-sensing lines FRL, and the value of the capacitance C may be varied when an object such as a finger is close to the force-touch panel 100. In FIG. 1, the capacitance C may represent a mutual capacitance Cm. The touch sensing unit 120 may sense electrical characteristics of the force-touch panel 100 to sense whether the touch panel 100 is touched and/or a touch position. For example, it is possible to sense whether or not a touch is generated on the force-touch panel 100, which is a two-dimensional plane composed of a first axis and a second axis, and/or a touch position of the force-touch panel 100. In detail, when the touch is generated in the force-touch panel 100, the second axial position of the touch may be detected by detecting the driving line TXL to which the driving signal is applied. Likewise, when the touch is generated in the force-touch panel 100, the first axial position of the touch may be detected by detecting the capacitance change from the received signal received through the touch-sensing line TRL.

In the above description, although a mutual capacitance type force-touch panel as the force-touch panel 100 has been described in detail, the force-touch panel 100 in a touch input apparatus of the present embodiment be realized by using various touch sensing methods such as a self-capacitance method, a surface capacitance method, a projected capacitance method, a resistive film method, a surface acoustic wave (SAW) method, an optical imaging method, a dispersive signal technology and an acoustic pulse recognition method.

The force-touch panel 100 for detecting a touch position in the touch input apparatus according to an exemplary embodiment of the present invention may be disposed on a display module (not shown). The display module may be a display panel included in a liquid crystal display (LCD), a plasma display panel (PDP), an organic light emitting diode (OLED), or the like. Accordingly, the user may perform an input action by touching a touch surface while visually checking a screen displayed on the display panel. Here, the display module may include a control circuit for controlling the touch input apparatus to display a desired content on a display panel by receiving a signal from a central processing unit (CPU) on the main board, an access point (AP), or the like.

Figure 2:
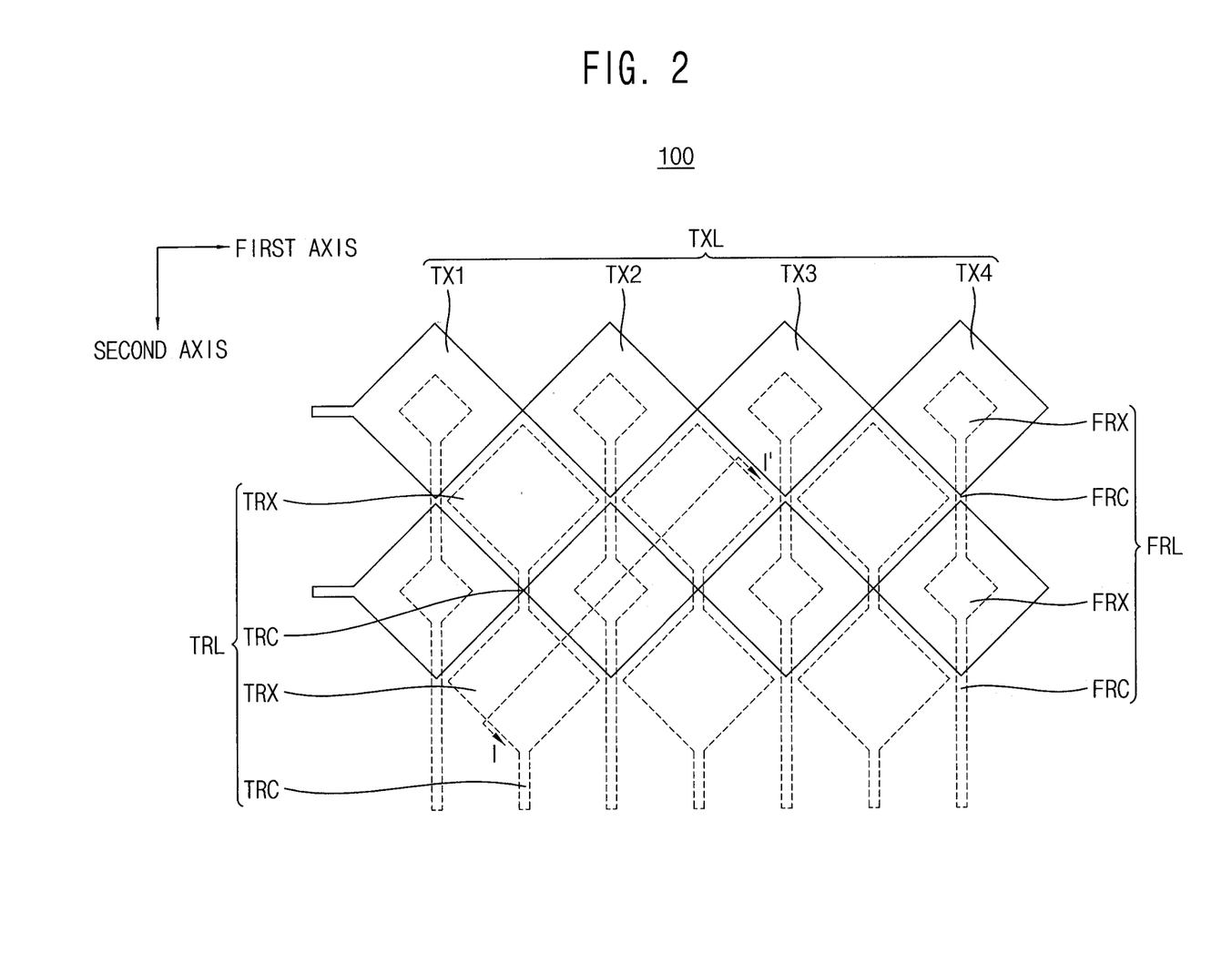
FIG. 2 is a plan view schematically illustrating the force-touch panel shown in FIG. 1.
Figure 3:
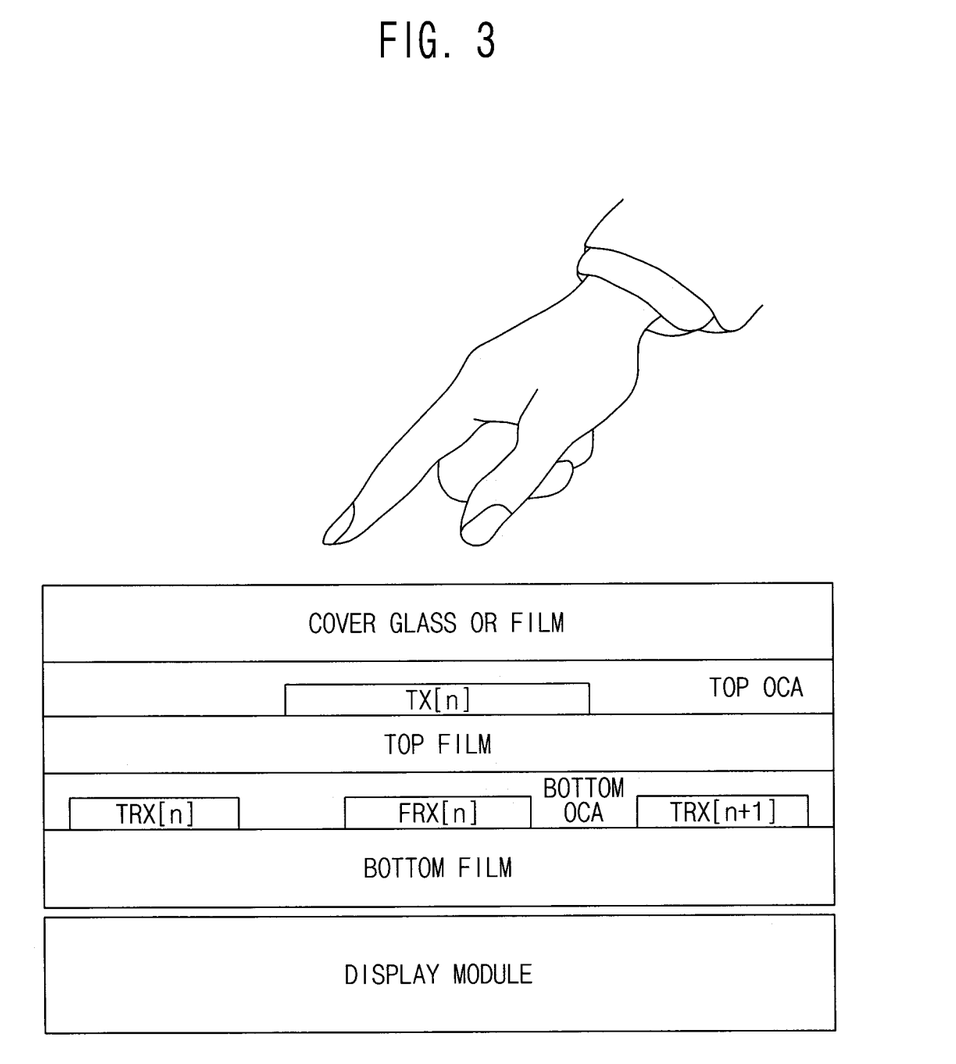
FIG. 3 is a cross-sectional view schematically illustrating the force-touch panel of FIG. 2.

FIG. 2 is a plan view schematically illustrating the force-touch panel shown in FIG. 1. FIG. 3 is a cross-sectional view schematically illustrating the force-touch panel of FIG. 2.

Referring to FIG. 2 and FIG. 3, the force-touch panel 100 includes a plurality of driving lines TXL, an insulation layer ISL disposed below the driving lines TXL, a plurality of touch-sensing lines TRL disposed below the insulation layer ISL, and a plurality of force-sensing lines FRL disposed below the insulation layer ISL adjacent to the touch-sensing lines TRL. In the present exemplary embodiment, the driving lines TXL are close to a surface to be touched by the user's finger or the like, and the touch-sensing lines TRL and the force-sensing lines FRL are far from a surface to be touched the user's finger or the like. Accordingly, the touch-sensing lines TRL and the force-sensing lines FRL are disposed close to a display module, and the driving lines TXL are disposed remotely from the display module.

Each of the driving lines TXL includes a plurality of driving electrodes TX1, TX2, TX3 and TX4 connected in series and is formed on an insulation layer ISL. In the present exemplary embodiment, each of the driving lines TXL extends along a first axis and is formed along a second axis. Each of the driving electrodes TX1, TX2, TX3 and TX4 has a diamond shape, and each of the driving lines TXL has a band shape in which diamond shapes are connected in series. Although it is described that each of the driving electrodes TX1, TX2, TX3 and TX4 has a diamond shape in the present exemplary embodiment, each of the driving electrodes TX1, TX2, TX3 and TX4 may have various shapes such as a circular shape, a triangular shape, a pentagonal shape, and the like.

The insulation layer ISL is formed below the driving lines TXL. In the present exemplary embodiment, the driving lines TXL are formed on the insulation layer ISL, and the touch-sensing lines TRL and the force-sensing lines FRL are formed below the insulation layer ISL.

Each of the touch-sensing lines TRL includes a plurality of touch-sensing electrodes TRX connected in series and a touch-connection member TRC connecting to the touch-sensing electrodes TRX adjacent to each other. Each of the touch-sensing lines TRL is disposed below the insulation layer ISL so as to cover each of the driving electrodes TE1, TE2, TX3 and TX4.

In the present exemplary embodiment, each of the touch-sensing lines TRL is formed along a second axis. Each of the touch-sensing electrodes TRX has a diamond shape, and each of the touch-sensing lines TRL has a band shape in which diamond shapes are connected in series. Although it is described that each of the touch-sensing electrodes TRX has a diamond shape in the present exemplary embodiment, each of the touch-sensing electrodes TRX may have various shapes such as a circular shape, a triangular shape, a pentagonal shape, and the like.

Each of the force-sensing lines FRL includes a plurality of force-sensing electrodes FRX connected in series and a force-connecting member FRC connecting the force-sensing electrodes FRX adjacent to each other. Each of the force-sensing lines FRL is disposed on the same plane as the touch-sensing lines TRL. That is, each of the force-sensing lines FRL and each of the touch-sensing lines TRL may be formed on the same layer. Further, each of the force-sensing lines FRL and each of the touch-sensing lines TRL may be formed from the same material.

In the present exemplary embodiment, each of the force-sensing lines FRL extends along a second axis and is formed along a first axis. Each of the force-sensing electrodes FRX has a diamond shape, and each of the force-sensing lines FRL has a band shape in which diamond shapes are connected in series. The size of each of the force-sensing electrodes FRX is substantially smaller than the size of each of the driving electrodes TX1, TE2, TX3 and TX4. Although it is described that each of the force-sensing electrodes FRX has a diamond shape in the present exemplary embodiment, each of the force-sensing electrodes FRX may have various shapes such as a circular shape, a triangle shape, a pentagonal shape, and the like.

As shown in FIG. 3, when viewed in a plane, each of the driving electrodes TX1, TE2, TX3 and TX4 may completely cover each of the force-sensing electrodes FRX. In particular, each of the force-sensing electrodes FRX is disposed to be orthogonal to a portion of each of the driving electrodes TX1, TE2, TX3 and TX4. Accordingly, each of the force-sensing electrodes FRX may define a first electrode of a capacitor, and a portion of the driving electrodes TX1, TE2, TX3 and TX4 orthogonal to the force-sensing electrodes FRX may define a second electrode of the capacitor.

Further, when viewed in a plane, each of the touch-sensing electrodes TRX may be formed so as to cover an area where the driving electrodes TX1, TE2, TX3 and TX4 are not formed.

Further, when viewed in a plane, each of the force-sensing electrodes FRX may be formed in an area where the driving electrodes TX1, TE2, TX3 and TX4 are formed.

Figure 4:
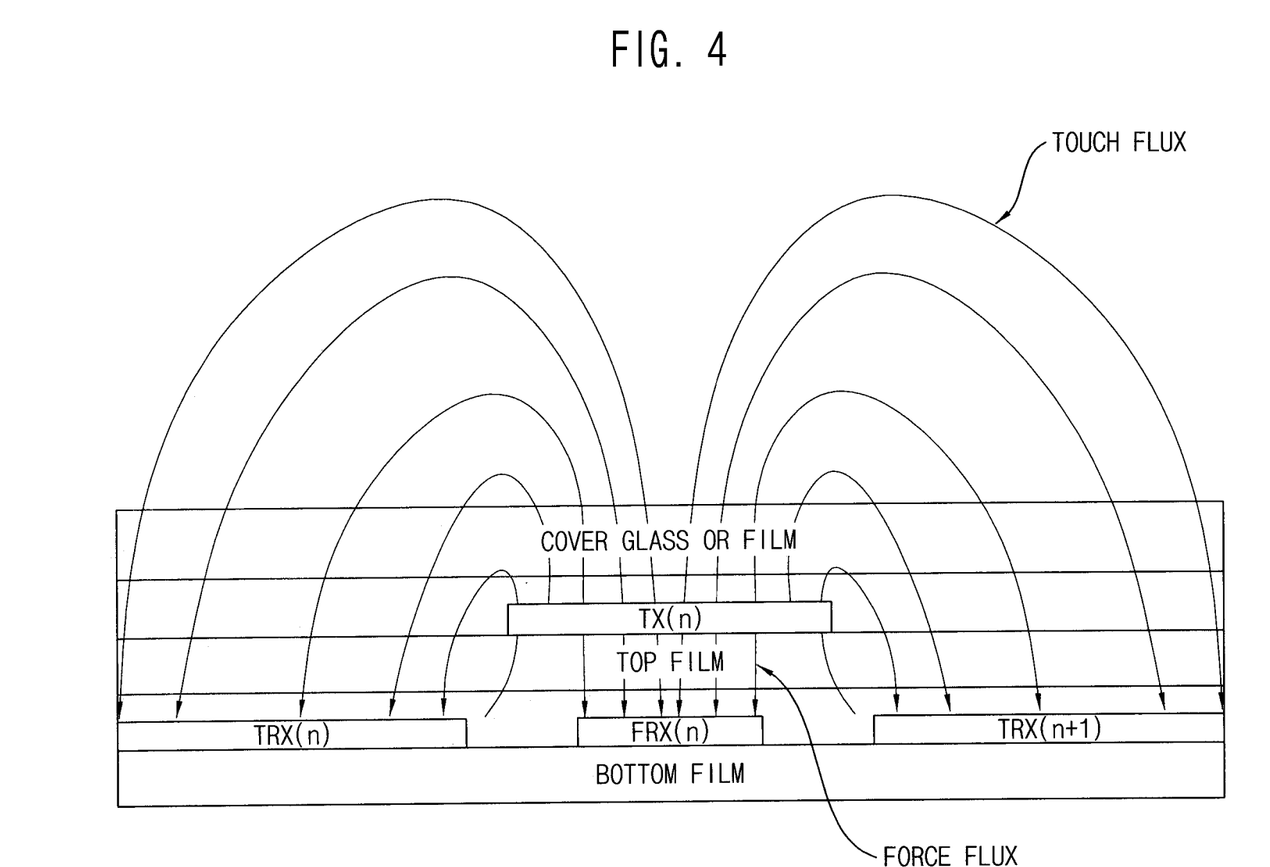
FIG. 4 illustrates a capacitive flux line when there is no touch in the force-touch panel according to the present invention.

FIG. 4 illustrates a capacitive flux line when there is no touch in the force-touch panel according to the present invention.

Referring to FIG. 4, when the driving electrode TX is driven, a flux line is formed between the driving electrode TX and the touch-sensing electrode TRX, which is symmetrical in fountain form. Here, the flux line is referred to as a touch-flux.

On the other hand, when the driving electrode TX is driven, strong flux lines are formed between the driving electrode TX and the force-sensing electrode FRX. Here, the strong flux lines are referred to as force-flux.

Figure 5:
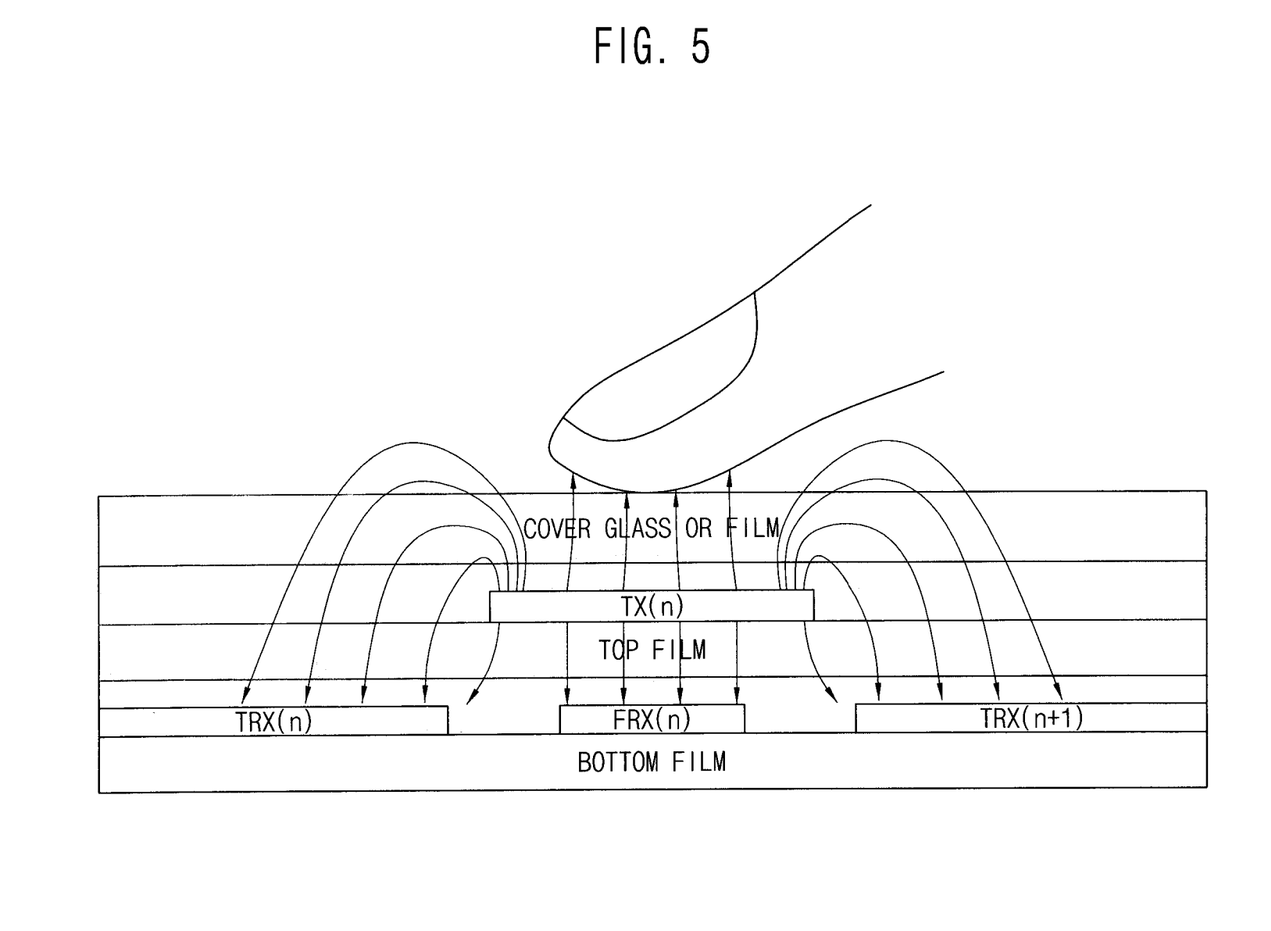
FIG. 5 illustrates a capacitive flux line when a force-free touch is made by a finger in a force-touch panel according to the present invention.
Figure 6A:
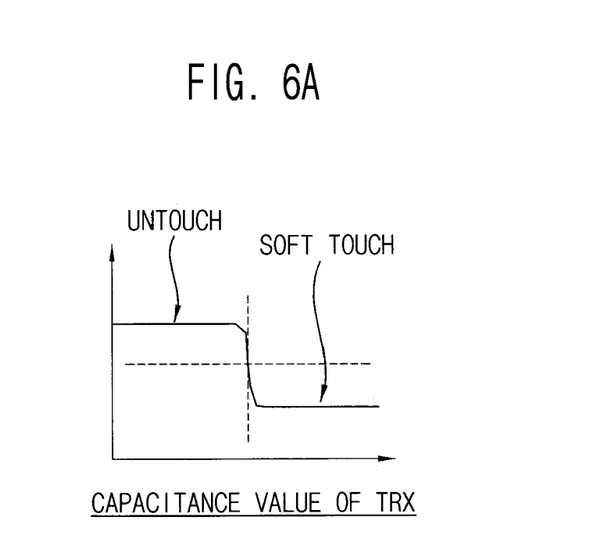
FIG. 6A is a graph schematically illustrating capacitance values of a touch-sensing electrode by a touch and a soft touch in the force-touch panel of FIG. 5.
Figure 6B:
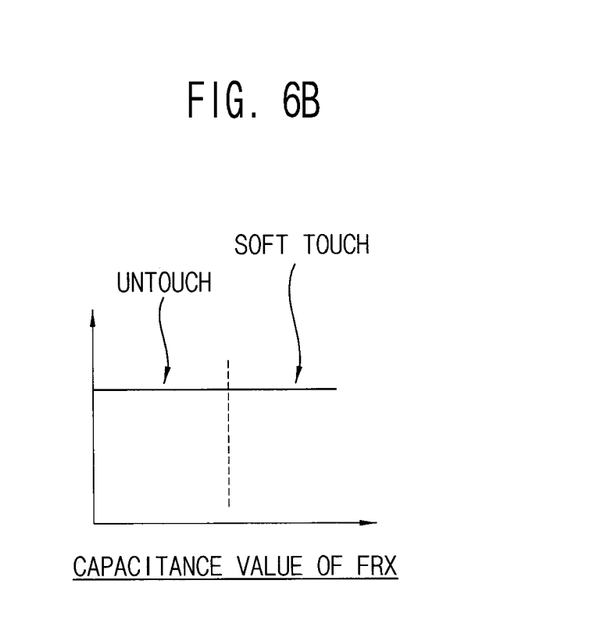
FIG. 6B is a graph schematically illustrating capacitance values of the force-sensing electrode by the touch and soft touch in the force-touch panel of FIG. 5.

FIG. 5 illustrates a capacitive flux line when a force-free touch is made by a finger in a force-touch panel 100 according to the present invention. FIG. 6A is a graph schematically illustrating capacitance values of a touch-sensing electrode by a touch and a soft touch in the force-touch panel 100 of FIG. 5. FIG. 6B is a graph schematically illustrating capacitance values of the force-sensing electrode FRX by the touch and soft touch in the force-touch panel 100 of FIG. 5.

Referring to FIG. 5 to FIG. 6B, when a soft touch is generated by a conductor such as a finger with almost no pressing pressure, a touch-flux line is absorbed by the conductor so that the amount of touch-flux flows into the touch-sensing electrode TRX is decreased. Accordingly, as shown in FIG. 6A, a capacitance value of the touch-sensing electrode TRX is reduced so that a touch is recognized.

On the other hand, since the force-flux has no pressure, there is also no gap change between the driving electrode TX and the force-sensing electrode FRX. Therefore, as shown in FIG. 6B, a capacitance value of the force-sensing electrode FRX is not changed, and a force is not recognized.

Figure 7:
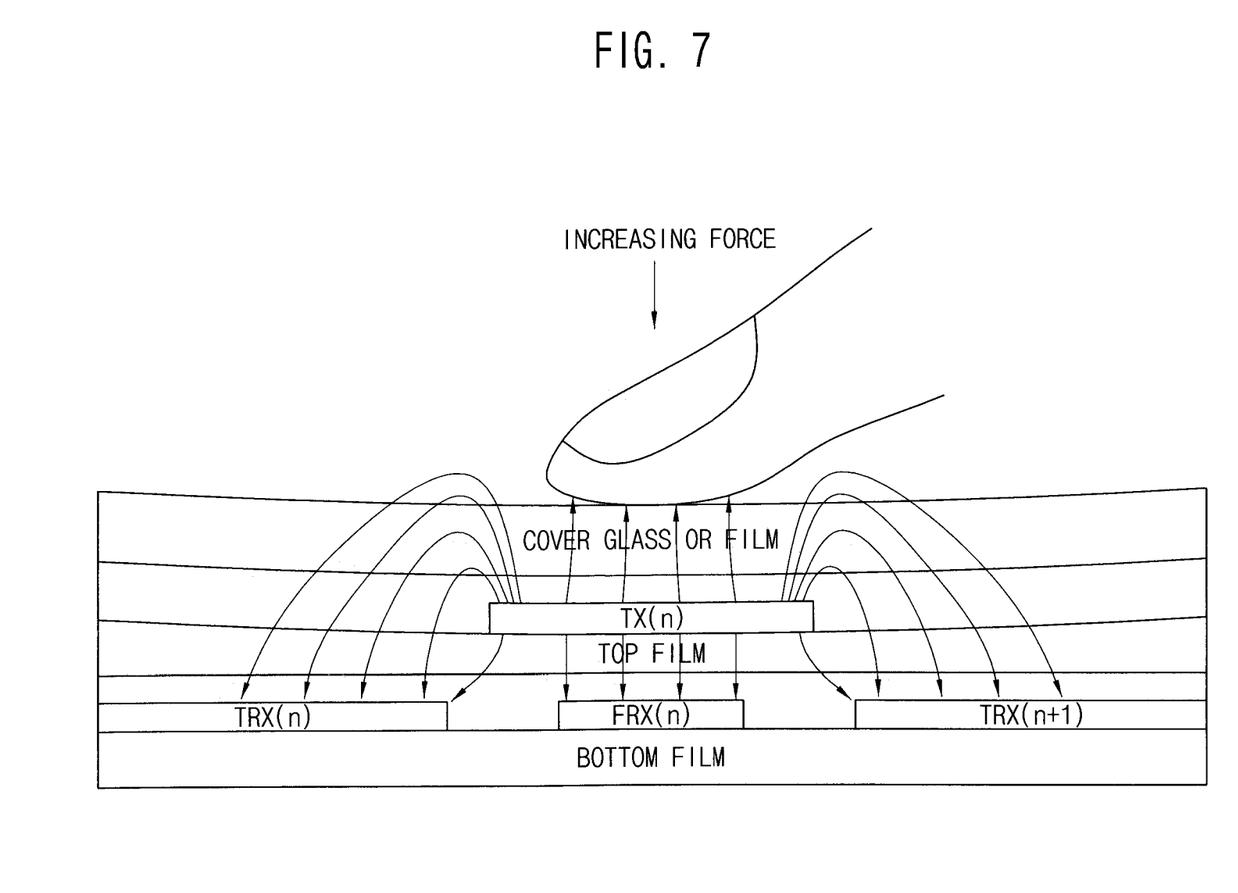
FIG. 7 illustrates a capacitive flux line when a touch with a force is performed by a finger in the force-touch panel according to the present invention.
Figure 8A:
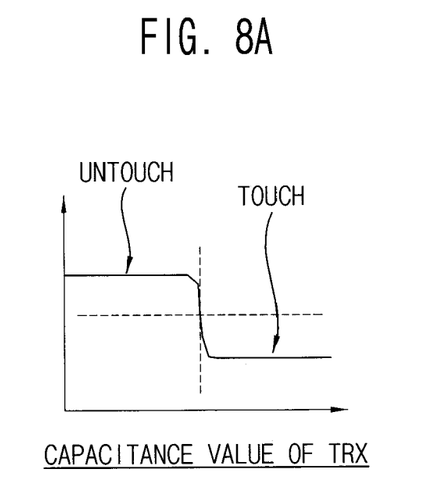
FIG. 8A is a graph schematically explaining capacitance values of touch-sensing electrodes by untouch and touch in the force-touch panel of FIG. 7.
Figure 8B:
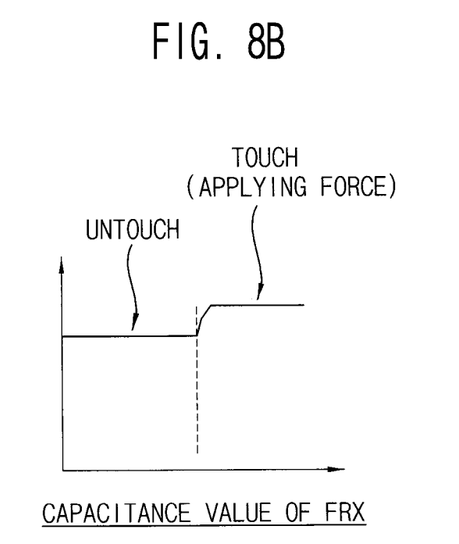
FIG. 8B is a graph schematically explaining capacitance values of the force-sensing electrode by untouch and force touch in the force-touch panel of FIG. 7.

FIG. 7 illustrates a capacitive flux line when a touch with a force is performed by a finger in the force-touch panel 100 according to the present invention. FIG. 8A is a graph schematically explaining capacitance values of touch-sensing electrodes TRX by untouch and touch in the force-touch panel 100 of FIG. 7. FIG. 8B is a graph schematically explaining capacitance values of the force-sensing electrode FRX by untouch and force touch in the force-touch panel 100 of FIG. 7.

Referring to FIG. 7 to FIG. 8B, when a pressure is further applied as compared with the soft touch described with reference to FIG. 5, since a touch-flux line is more absorbed by the finger, the density and the number of flux lines flowing into the touch-sensing electrode TRX is decreased. Therefore, as shown in FIG. 8A, a capacitance value of the touch-sensing electrode TRX is further reduced, so that a touch is felt more strongly.

Meanwhile, due to the additional applied pressure, a cover glass touching a finger, a OCA film below the cover glass, and the like are bent downward, and thereby the thickness of the driving electrode TX, the ITO, the OCA film and the force-sensing FRX is reduced. Therefore, a strong force-flux line is formed due to the distance between the narrowed two electrodes, so that a capacitance value of the force-sensing electrode FRX is increased as shown in FIG. 8B.

That is, since the distance 'd' is decreased in the equation of $C=\epsilon\mu A/d$ (here, 'A' is a size of an overlapping electrode area, and 'd' is a distance between the overlapping electrodes), a capacitance value is increased.

Figure 9:
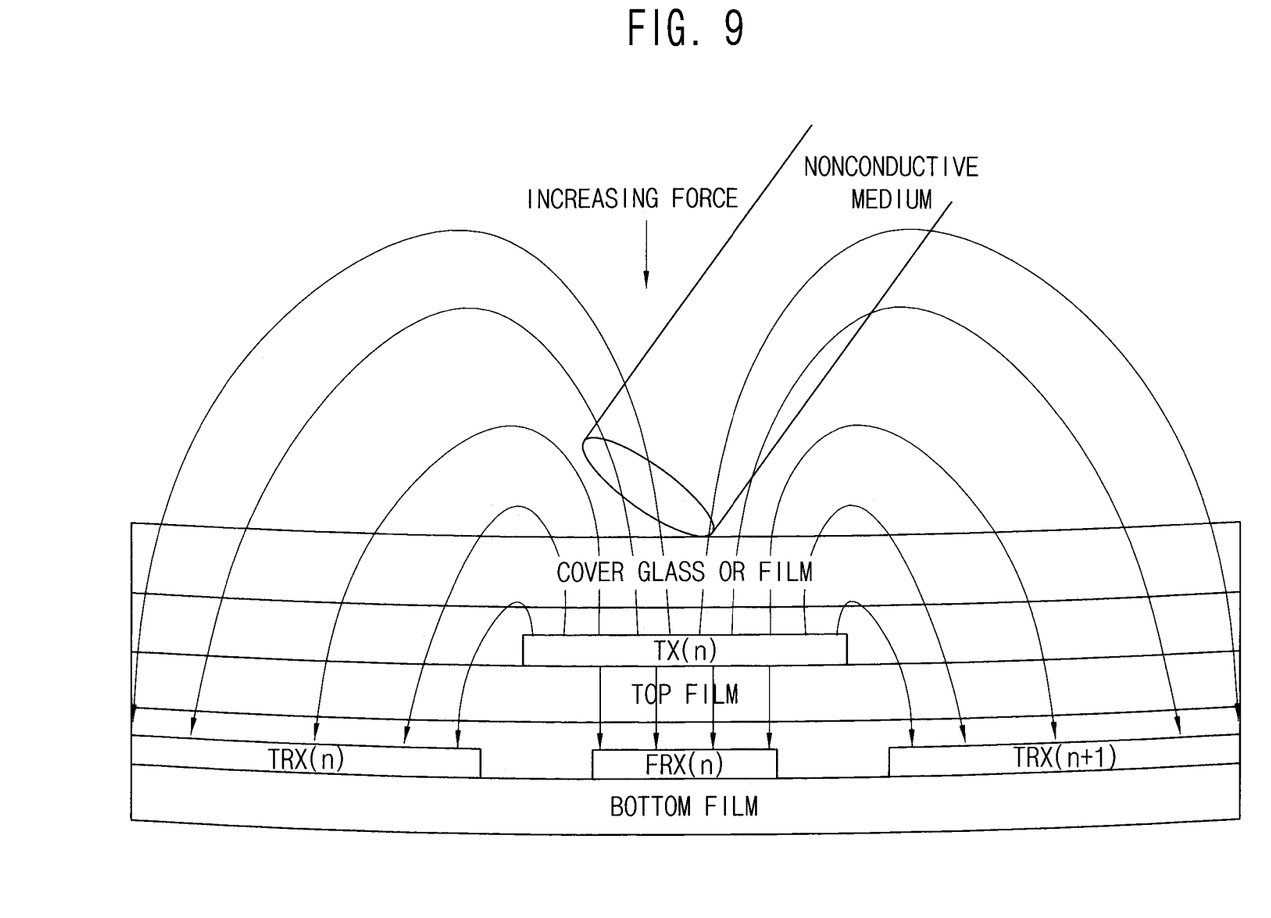
FIG. 9 illustrates a capacitive flux line when a force is applied by a non-conductive material in a force-touch panel according to the present invention.
Figure 10A:
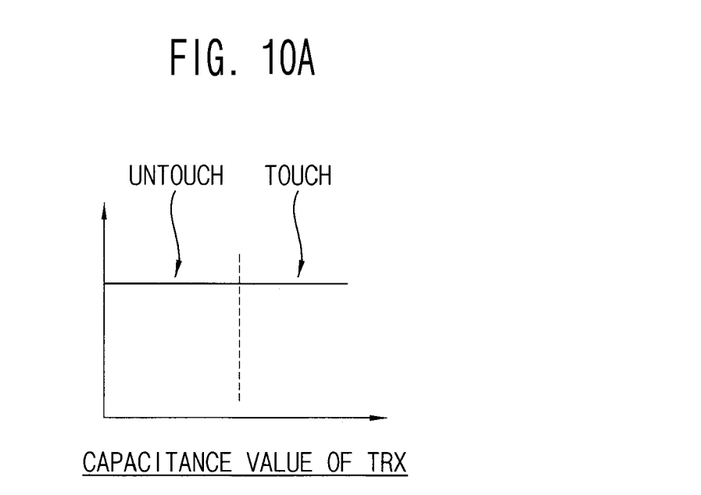
FIG. 10A is a graph schematically explaining capacitance values of touch-sensing electrodes by untouch and touch in the force-touch panel of FIG. 9.
Figure 10B:
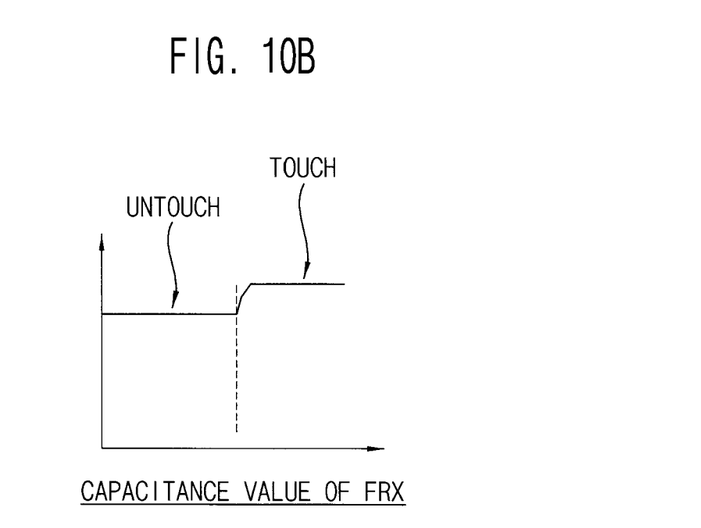
FIG. 10B is a graph schematically explaining capacitance values of the force-sensing electrode by untouch and touch in the force-touch panel of FIG. 9.

FIG. 9 illustrates a capacitive flux line when a force is applied by a non-conductive material in a force-touch panel 100 according to the present invention. FIG. 10A is a graph schematically explaining capacitance values of touch-sensing electrodes TRX by untouch and touch in the force-touch panel 100 of FIG. 9. FIG. 10B is a graph schematically explaining capacitance values of the force-sensing electrode FRX by untouch and touch in the force-touch panel 100 of FIG. 9.

Referring to FIG. 9 to FIG. 10B, when a pressure is applied by an insulating material or a non-conductive material, a touch-flux passes through the non-conductive material and directly flows into the touch-sensing electrode TRX. Therefore, as shown in FIG. 10A, the capacitance reference value (i.e., a reference value of a mutual capacitance) of the touch-sensing electrode TRX is hardly changed due to a touch of the insulating material or the non-conductive material.

On the other hand, the thickness between the driving electrode TX, the ITO, the OCA film and the force-sensing electrode FRX is reduced due to a pressure of the insulating material or the non-conductive material. Therefore, a strong force-flux is formed due to the distance between the narrowed two electrodes, so that a capacitance value of the force-sensing electrode FRX is increased as shown in FIG. 10B.

As described above, according to the present invention, driving lines are disposed close to a surface to be touched by the user's fingers or the non-conductive medium, touch-sensing lines and force-sensing lines are disposed far from the touched surface to form a force-touch panel. Accordingly, a touch-sensing function and a force-sensing function may be provided to a force-touch panel to detect a touch force as well as a touch position on a touch screen.

Having described exemplary embodiments of the present invention, it is further noted that it is readily apparent to those of reasonable skill in the art that various modifications may be made without departing from the spirit and scope of the invention which is defined by the metes and bounds of the appended claims.

What is claimed is:

1. A force-touch panel comprising:
a top film;
a plurality of driving lines formed on the top film, the driving lines comprising a plurality of driving electrodes connected in series;
a top OCA formed on the top film to cover the driving lines;
a bottom film;
a plurality of touch-sensing lines formed on the bottom film, the touch-sensing lines comprising a plurality of touch-sensing electrodes connected in series disposed below a layer in which the driving electrodes are formed to output a touch-sensing signal coupled by a capacitance formed between the driving electrode and the touch-sensing electrode;
a plurality of force-sensing lines formed on the bottom film, the force-sensing lines comprising a plurality of force-sensing electrodes connected in series disposed on a same plane as the touch-sensing lines so as to be covered by each of the driving electrodes to output a force-sensing signal coupled by a capacitance formed between the driving electrode and the force-sensing electrode; and,
a bottom OCA formed below the top film and formed on the bottom film to cover the touch-sensing lines and the force-sensing lines,
wherein the number of the force-sensing electrodes and the number of the driving electrodes are equal to each other so as to enable multi-force sensing through the force-sensing electrodes.

2. The force-touch panel of claim 1, wherein each of the driving electrodes has a diamond shape, and each of the driving lines has a band shape in which diamond shapes are connected in series.

3. The force-touch panel of claim 1, wherein each of the touch-sensing electrodes has a diamond shape, and each of the touch-sensing lines has a band shape in which diamond shapes are connected in series.

4. The force-touch panel of claim 1, wherein each of the force-sensing electrodes has a diamond shape, and each of the force-sensing lines has a band shape in which diamond shapes are connected in series.

5. The force-touch panel of claim 1, wherein the driving line extends along a first axis, and each of the touch-sensing line and the force-sensing line extends along a second axis.

6. The force-touch panel of claim 1, wherein a size of each of the force-sensing electrodes is substantially smaller than a size of each of the driving electrodes.

7. The force-touch panel of claim 1, when viewed in a plane, wherein each of the driving electrodes completely covers each of the force-sensing electrodes.

8. The force-touch panel of claim 1, when viewed in a plane, wherein each of the touch-sensing electrodes is formed to cover an area where the driving electrodes are not formed.

9. The force-touch panel of claim 1, when viewed in a plane, wherein each of the force-sensing electrodes is formed in an area where the driving electrodes are formed.

10. A force-touch sensing device comprising:
- a force-touch panel comprising:
  - a top film;
  - a plurality of driving lines formed on the top film, the driving lines comprising a plurality of driving electrodes connected in series;
  - a top OCA formed on the top film to cover the driving lines, a bottom film;
  - a plurality of touch-sensing lines formed on the bottom film, the touch-sensing lines comprising a plurality of touch-sensing electrodes connected in series, disposed below a layer in which the driving electrodes are formed to output a touch-sensing signal coupled by a capacitance formed between the driving electrode and the touch-sensing electrode;
  - a plurality of force-sensing lines formed on the bottom film, the force-sensing lines comprising a plurality of force-sensing electrodes connected in series, disposed on a same plane as the touch-sensing lines so as to be covered by each of the driving electrodes to output a force-sensing signal coupled by a capacitance formed between the driving electrode and the force-sensing electrode; and
  - a bottom OCA formed below the top film and formed on the bottom film to cover the touch-sensing lines and the force-sensing lines,
- a driving unit supplying a driving signal to each of the driving lines;
- a touch sensing unit receiving a touch-sensing signal from each of the touch-sensing lines;
- a force-sensing unit receiving a force-sensing signal from each of the force-sensing lines; and
- a control unit controlling an operation of the touch sensing unit and the force-sensing unit, calculating whether a touch is generated or not and a touch position based on the touch-sensing signals, and calculating whether a force is generated or not and a force position based on the force-sensing signals,
wherein the number of the force-sensing electrodes and the number of the driving electrodes are equal to each other so as to enable multi-force sensing through the force-sensing electrodes.

11. The force-touch sensing device of claim 10, wherein the touch-sensing signal is a signal coupled by a capacitance formed between the driving electrode and the touch, and, the force-sensing signal is a signal coupled by a capacitance formed between the driving electrode and the force-sensing electrode.

12. The force-touch sensing device of claim 10, wherein the driving unit, the touch sensing unit, the force-sensing unit and the control unit are implemented in a single chip.

13. A display system comprising:
- a display panel; and
- a force-touch panel disposed on the display panel, wherein the force-touch panel comprises:
  - a top film;
  - a plurality of driving lines formed on the top film, the driving lines comprising a plurality of driving electrodes connected in series;
  - a top OCA formed on the top film to cover the driving lines;
  - a bottom film;
  - a plurality of touch-sensing lines formed on the bottom film, the touch-sensing lines comprising a plurality of touch-sensing electrodes is-connected in series, disposed below a layer in which the driving electrodes are formed to output a touch-sensing signal coupled by a capacitance formed between the driving electrode and the touch-sensing electrode; and
  - a plurality of force-sensing lines formed on the bottom film, the force-sensing lines comprising a plurality of force-sensing electrodes connected in series, disposed on a same plane as the touch-sensing lines so as to be covered by each of the driving electrodes to output a force-sensing signal coupled by a capacitance formed between the driving electrode and the force-sensing electrode; and
  - a bottom OCA formed below the top film and formed on the bottom film to cover the touch-sensing lines and the force-sensing lines,
wherein the number of the force-sensing electrodes and the number of the driving electrodes are equal to each other so as to enable multi-force sensing through the force-sensing electrodes.

* * * * *